United States Patent [19]
LaBarber

[11] 3,799,619

[45] Mar. 26, 1974

[54] VIBRATION DAMPENING ASSEMBLY

[75] Inventor: Joseph A. LaBarber, Kern City, Calif.

[73] Assignee: Kurt J. Wagner, Sherman Oaks, Calif. ; a part interest

[22] Filed: May 18, 1972

[21] Appl. No.: 254,706

[52] U.S. Cl. ............................. 301/5 BA, 74/573
[51] Int. Cl. ............................................ B60b 13/00
[58] Field of Search ............ 301/5 BA, 5 B; 74/573

[56]          References Cited
         UNITED STATES PATENTS

| | | | |
|---|---|---|---|
| 3,433,534 | 3/1969 | Mercer | 301/5 BA |
| 3,410,154 | 11/1968 | Deakin | 74/573 |
| 2,895,766 | 7/1959 | Leopold | 301/5 BA |
| 3,346,303 | 10/1967 | Wesley | 301/5 BA |

FOREIGN PATENTS OR APPLICATIONS

| | | | |
|---|---|---|---|
| 832,048 | 4/1960 | Great Britain | 301/5 BA |
| 919,076 | 10/1954 | Germany | 74/573 |

*Primary Examiner*—Richard J. Johnson
*Attorney, Agent, or Firm*—Markva & Smith

[57]          ABSTRACT

The vibration dampening assembly effectuates an automatic dynamic balancing technique for rotating masses operating at all circumferential speeds and maintains the weight members in their balance position when the assembly is not rotating. The vibration dampening assembly includes an annular retaining means adapted for attachment to a rotating mass. Weight means are movably disposed in the retaining means. Biasing means are located in the retaining means to provide a sufficient amount of force to hold the weight means in place against the pull of gravity within and with respect to the retaining means. However, the force of the biasing means is not effective to overcome the movement of the weight means within and with respect to the retaining means upon rotation of the assembly. Various features of the invention are directed to the specific type of biasing means and weight members used within the retaining means.

8 Claims, 14 Drawing Figures

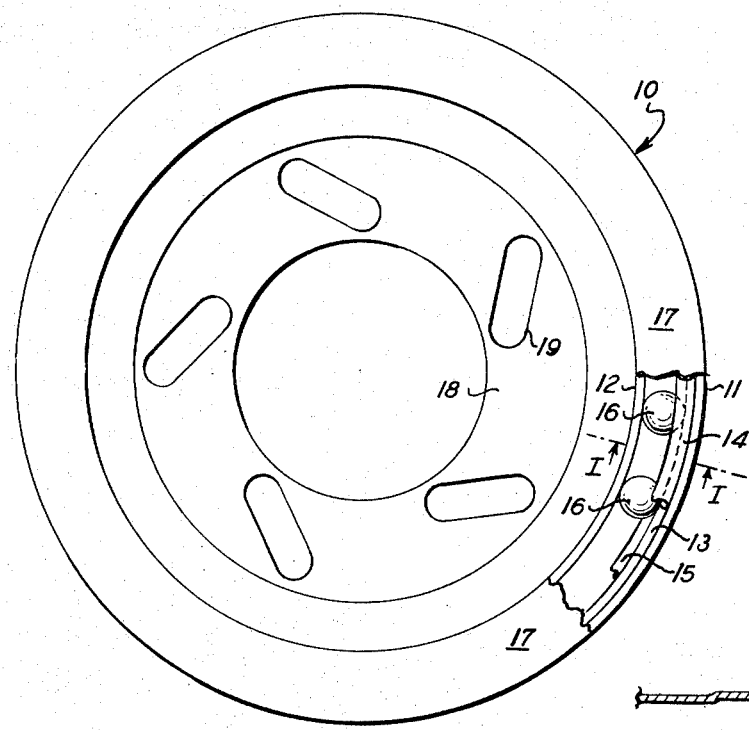
FIG. 1
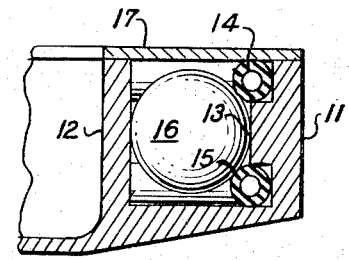
FIG. 3
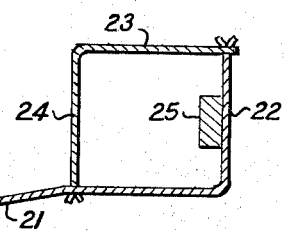
FIG. 4
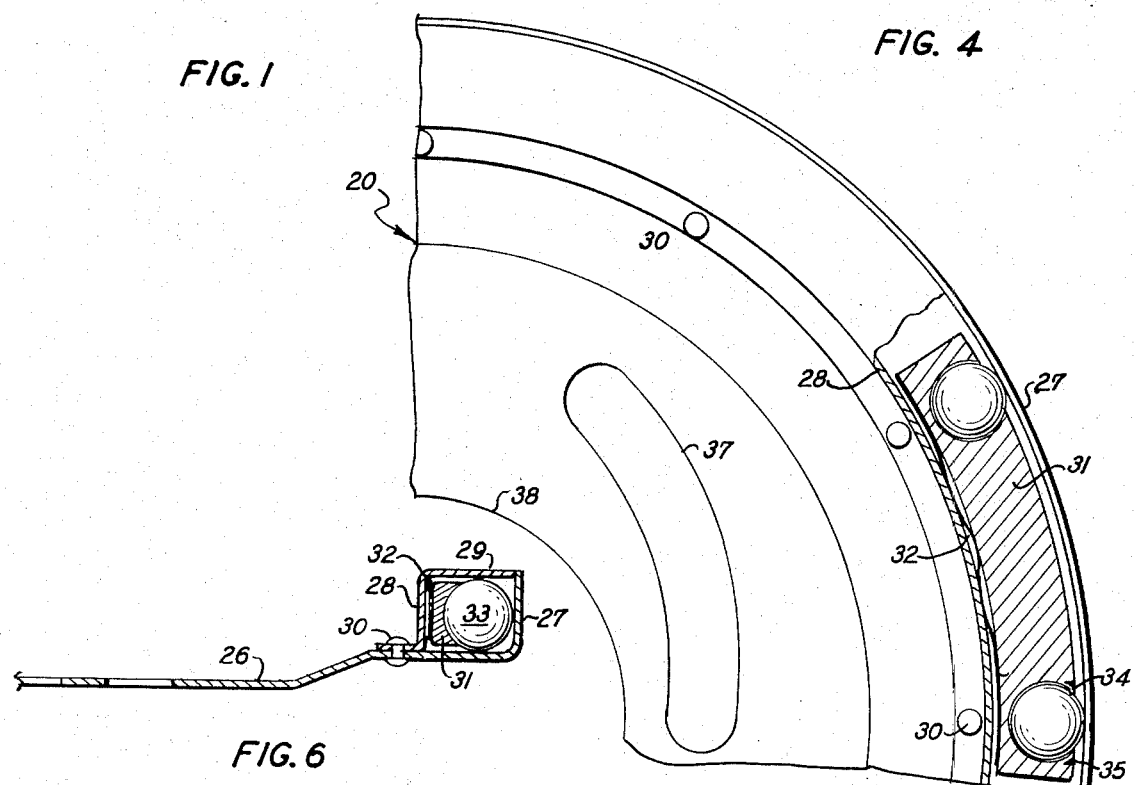
FIG. 6
FIG. 5

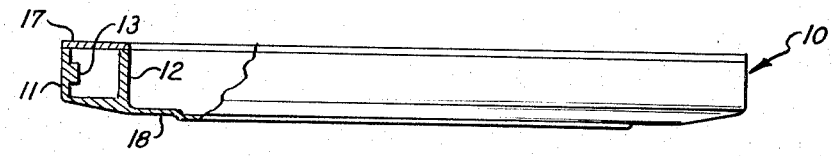
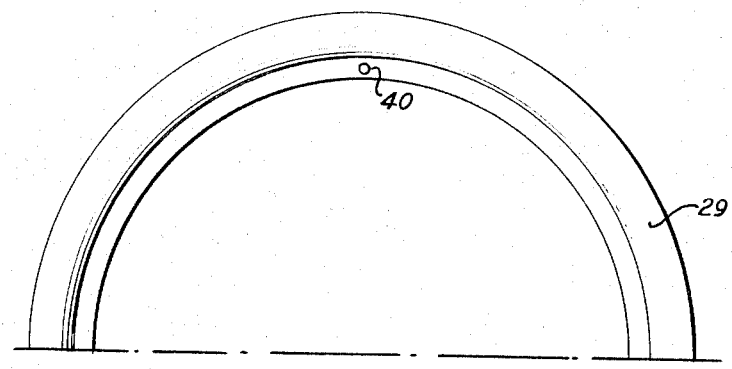
FIG. 2
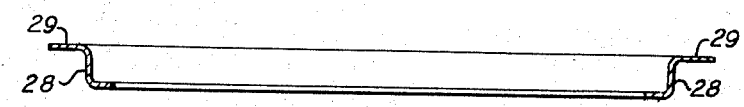
FIG. 9
FIG. 10
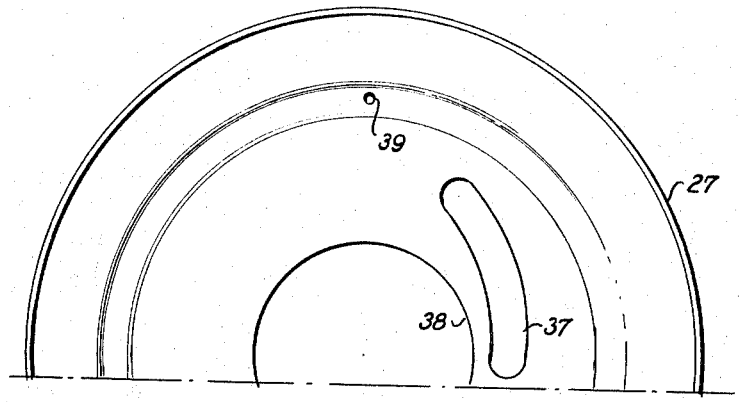
FIG. 7
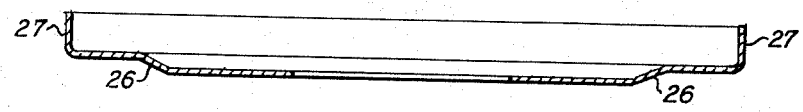
FIG. 8

VIBRATION DAMPENING ASSEMBLY

BACKGROUND OF THE INVENTION

The invention relates to an automatic dynamic balancing technique for rotating masses such as automobile wheels, airplane wheels, rotating antennas, space stations, space vehicle pay loads, missile warheads, motor shafts, spinning appliances and helicopter blades.

Many types of balancers are presently known and utilized. However, they do not provide the optimum dynamic balance for various reasons. Many of the prior art balancers utilize the idea of fixing a retainer of some kind to the rotatable mass. Weights such as shot and spherical balls are placed in the retainer and allowed to move freely to the light side of the rotating mass to accomplish balancing. However, when the rotatable mass is at rest, the weights are pulled to the bottom of the retainer by the force of gravity. Consequently, each time the mass begins to rotate again, there is an extreme amount of imbalance associated with the assembly. Therefore there is possible danger in using this type of prior art balancing technique universally with all types of rotatable masses.

This type of mechanism provides a form of balancing, particularly when the masses are rotating above their critical speed. However, it is actually a detriment when the masses rotate below critical speeds because weights are heavily influenced by the pull of gravity. Such a balancing does more harm than good. For example, an automobile wheel of a vehicle which is driven primarily around town is generally rotating below the critical speed of wheels. Consequently, optimum balancing thereof is not achieved. Fluids have been utilized with the weights to facilitate their positioning. However, the combination does nothing to correct the above identified problem.

The idea of placing a fusible material in a retainer which is fixed to the rotatable mass has often been suggested in the prior art. With this arrangement, the fusible material is rendered molten when the mass is rotating above the critical speed and flows to the light side of the rotating mass to provide balancing. When the fusible material is in this position, it is allowed to solidify to provide balancing. This type of balancing has some merit at speeds both below and above the critical speed of rotation. Once the fusible material solidifies, it remains in a given position at all speeds. However, it has been found through experimentation that this technique does not provide optimum balancing.

Many prior art balancers also utilize some type of mechanical device for fixing a weight movable in a retainer that may change position when the rotatable mass approaches or goes below critical speed. This type of mechanism provides for a type of balancer operative at all speeds of rotation. However, it has been found that this is not enough to provide the optimum dynamic balance. It is not only necessary to position and hold weight at the proper point in a retainer, but to obtain dynamic balance it is also necessary that the retainer allow the weights to be distributed on opposite sides of the geometric center or center of gravity of the rotatable mass. Generally, prior art devices fail to take this factor into consideration.

The more common type of wheel balancing means is static balancing. Lead weights are clamped to the rim portion of the wheel. This technique requires the service of experienced mechanics and special equipment. Such weights are frequently lost or misplaced when repairing or changing tires. Therefore, it will be readily understood that a large percentage of vehicles are operated with unbalanced wheels which cause vibration of the vehicle, uneven wear of the tires, excessive wear of the bearings and steering mechanism and other parts of the vehicles. Such weights wear or become flattened and thus fail to respond to an out of balance condition of the wheel or body. When no fluid is used, the movement of the weights, particularly when using weights of substantial size with respect to the size of the annulus, is too rapid and thus do not maintain the dynamic balance of the variations in acceleration or deceleration.

PURPOSE OF THE INVENTION

The primary object of this invention is to provide an assembly which is adapted to be connected to a rotatable mass to provide a dynamic balance thereof.

Another object is to provide an assembly in combination with a vehicular wheel assembly to compensate for tire distortion, out of roundness, out of roundness and mounting position of the brake drum, road buildup on the wheel and brake drum, and looseness in the axle and suspension.

A similar object is to provide a wheel balancing device which may supplement the balance of a static balanced wheel wherein conventional weights have been used to achieve the static balance.

Another object of the invention is the provision of a device of this class which may be easily attached to a vehicle wheel on the inwardly disposed side of the wheel adjacent the periphery of of the brake drum.

SUMMARY OF THE INVENTION

The vibration dampener assembly as described herein includes an annular retainer means adapted for attachment to a rotatable mass. A weight means is movably disposed in the retainer means. Biasing means located in the retainer means provide a sufficient amount of force to hold the weight means in place against the pull of gravity but said force is not effective to overcome movement of the weight means on rotation of the retainer means.

The difficulties associated with the prior art techniques are overcome by providing a retainer which is designed so that the weights placed therein can be retained in a position on either or both sides of the geometric center or center of gravity of the rotating mass. The techniques utilized in conjunction with this invention include the movable disposition of a weight in a retainer and yet the weight can be fixed and maintained in a balance position at all speeds of rotation to accomplish a near perfect dynamic balance heretofore unattainable.

In a specific embodiment of this invention, the vibration dampener assembly is a dynamic wheel balancer. The retainer means includes means for attaching the assembly onto a vehicular wheel assembly. A feature of this particular embodiment is the use of a hub portion having a slot configuration which fits over the studs of the vehicular wheel assembly. A plurality of slots extends at a transverse angle with respect to the radius of the wheel assembly. This particular slot configuration enables the use of the dynamic wheel balancer with a multiple number of wheel assemblies.

An important feature of this invention is directed to the use of a resilient member which provides frictional force greater than the pull of gravity. In one embodiment, at least one ring member is disposed between the inside surface of the retaining means and the weight means. The ring member is composed of a resilient material which compresses with respect to itself when the vibration dampening assembly is rotating. Under these conditions, the weight means are distributed along the circumference of the vibration dampening assembly to compensate for any imbalance at any desired speed of rotation. When the dampening assembly slows down and stops, the biasing means holds the weight means against the inside surface of the retaining means. That is, the weight means are held in the same position they were in while they were under the influence of the forces associated with the rotating assembly.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a partial top plan view of a vibration dampening assembly made in accordance with this invention;

FIG. 2 is a side elevational view of the assembly of FIG. 1;

FIG. 3 is a fragmentary sectional view taken along line I—I of FIG. 1;

FIG. 4 is a fragmentary sectional view of another embodiment of a dampening assembly made in accordance with this invention;

FIG. 5 is a partial, fragmentary plan view of a further embodiment of a dampening assembly made in accordance with this invention;

FIG. 6 is a cross-sectional view of the assembly shown in FIG. 5;

FIG. 7 is a partial top plan view of a hub and rim member in the embodiment of FIG. 5;

FIG. 8 is a cross-sectional view of the member shown in FIG. 7;

FIG. 9 is a partial top plan view of the cover and inner rim member in the embodiment of FIG. 5;

FIG. 10 is a cross-sectional view of the member shown in FIG. 9;

DESCRIPTION OF SPECIFIC EMBODIMENTS

Figure 11:
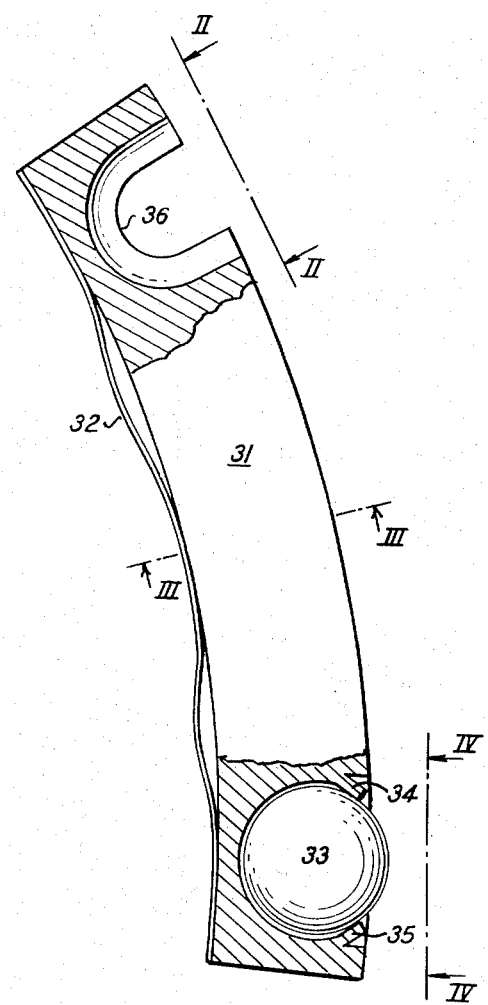
FIG. 11 is a side elevational view of a counterweight used in the embodiment of FIG. 5.
Figure 12:
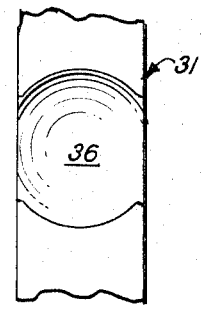
FIGS. 12, 13 and 14 are detail views of the weight in FIG. 11 taken along lines II—II, III—III, and IV—IV, respectively.

More specifically, a vibration dampening assembly, generally designated 10, includes an annular retaining means having an outer flange portion 11 and an inner flange portion 12. A plurality of steel balls 16 are movably disposed in the retaining means. Biasing means including O-rings 14 and 15 are located between the inside surface of the outer flange 11 and the balls 16. The O-ring members 14 and 15 are composed of a resilient material such as rubber and provide a sufficient amount of force to hold the balls 16 in place against the pull of gravity when the assembly 10 is not rotating.

On the other hand, when the assembly 10 is rotating, the O-rings 14 and 15 are compressed and provide a centripetal force which responds to the force on the balls 16 due to the centrifugal force of rotation. When the O-rings 14 and 15 are compressed, the balls 16 are no longer held against the inner surface of the inner flange portion 12. Therefore the balls 16 will be freely movable along the raceway 13 to position themselves about the center of gravity to balance the rotating mass to which the assembly 10 is attached. That is, the balls 16 will move to a balance position when the biasing means are compressed.

A cover member 17 is fixedly attached to the flange portions 11 and 12 forming a closed annular retaining means. The retaining means is adapted for attachment to a rotating mass in this particular embodiment by way of the hub portion 18 which includes slots 19. The slots 19 are aligned around the center of the assembly at a transverse angle with respect to the radius of the wheel assembly and may be easily fitted over the studs located around various sizes of wheel hubs.

The hub portion 18 is beveled as shown. Therefore, any weights disposed on a brake drum construction do not have to be removed when this particular vibration dampening assembly 10 is placed adjacent thereto. This greatly simplifies the installation and maintenance of a vehicular wheel assembly to which the dampening assembly 10 is attached.

In this embodiment, the walls of the assembly 10 are formed by cast aluminum. However, it is also possible to make the walls a thickness of about 0.050 inch using stainless steel sheet stock as shown in FIG. 4. The hub portion 21 is beveled and is integrally formed and coextensive with the outer flange portion 22. The cover portion 23 and inner flange portion 24 of the retaining means are formed by another annular piece that is fixedly attached to the annular member including the hub portion 21 and outer flange portion 22. An annular steel race 25 is disposed along the inner surface of the outer flange portion 22. The configuration as shown in FIG. 4 may then be fitted with O-rings and balls in the same manner as the embodiment shown in FIGS. 1–3.

The embodiment shown in FIGS. 5–10 includes two annular ring members that are fixedly attached to form a retaining means in which a weight means may be disposed. The first annular ring member includes a rim portion 26 having a beveled section and a coextensive flange section 27. Curved slots 37 are located around the center hole 38 which is of a size effective to fit over the hub of a vehicular wheel assembly. Although only one slot 37 is shown in the drawings, there are five slots that are disposed equidistant about the center of the annular ring.

The second annular ring member includes a flange portion 28 and a cover portion 29 that is perpendicular thereto. The second ring member is fixedly attached to the first ring member by rivets 30 placed through registered holes 39 and 40 as shown in FIG. 6. This particular construction of the assembly 20 is very inexpensive from the standpoint of materials and very easily manufactured using well known prior art techniques. Again, this particular assembly is adapted to attachment to a varied number of wheel assemblies due to the slot configuration and the configuration of the hub portion 26.

Figure 13:
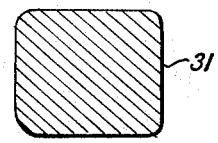
Figure 14:
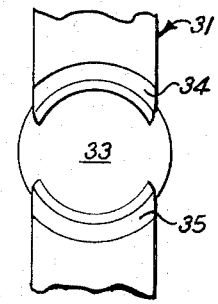

The arcuate weight member 31 as shown in FIGS. 5–14 has a rectangular cross section as shown in FIG. 13. Two sockets 36 are formed therein and have a size and shape configuration effective to receive the ball bearing member 33. Tab portions 34 and 35 are bent inwardly to retain the ball member 33 within the socket portion 36. The weight member 31 has an arcuate shape which matches the annular configuration of the retaining means of the assembly 20. When the assembly 20 is not rotating, the spring member 32 provides an effective amount of frictional force against the inner surface of the flange portions 27 and 28 to counter the pull of gravity on the weight 31. Consequently, the arcuate weight 31 remains in the balance position to which it moved during rotation of the assembly 20.

In this particular embodiment, a wave form spring member 32 is associated with each arcuate weight 31. The spring 32 has two convolutions and a straight, flat portion on either side of it. One of the straight portions is fixedly attached to the inner diameter of the arcuate weight 31. In another embodiment, the spring member 32 may be fitted into a groove that has been formed along the inner diameter of the weight 31. When the assembly 20 is stationary, the spring member 32 provides a sufficient frictional contact between the inner flange portion 28 to overcome the gravitational force equal to the weight of the arcuate weight 31. However, the tension force creating the frictional contact is not great enough that it will influence the positioning of the weight 31 as a result of the centrifugal force created when the mass rotates. It might even be possible under high rotational speeds for the wave form spring 32 to tend to flatten out. Under these conditions, the effective radial circumference would be increased. Consequently, the amount of frictional force would be further decreased and the weight 31 would move very easily within the annular channel formed between the flange portions 27 and 28.

While the weight 31 may be constructed of any type of material, steel would be the most economical. It has been found that three weights will provide the desired balance condition in the embodiment as shown in FIGS. 5 through 14.

It may be possible to eliminate the use of balls 33 by either providing a Teflon coating along the outside diameter of the weight 31 and/or including a minimal number of bumps located on the outer diameter of the weight 31. It is the objective to reduce the frictional contact area on the outside diameter of the weight 31 so that it will move freely while the mass is being rotated.

It has been found that a liquid filler may be used in conjunction with the embodiment including the balls 16. The liquid provides a dampening effect within the retaining means and also constitutes a sound eliminating material. The liquid may also be used as a lubricating material within the retaining means. It has been found, however, that this liquid filler material is not absolutely necessary in all forms of the vibration dampening assembly as disclosed herein.

ADVANTAGES OF THE INVENTION

The primary advantage of this invention is that it effectuates a balancing of a rotating mass that is self-correcting at all times and is maintained in its balance position even after rotation has stopped. When used in conjunction with a vehicular wheel assembly, untrue running of wheel and tire at all speed levels and road conditions which are infinitely varied due to forces created by distortion in the system of wheel position, tire deformation and the like, is completely compensated for. The design of the mounting flange or hub portion allows for difference of wheel mounting lug positions and attachment. In other words, it is a universally available vibration dampening assembly.

While the vibration dampening assembly has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A vibration dampening assembly for a rotatable mass comprising:
   a. an annular retaining means adapted for attachment to a mass which rotates about an axis of rotation,
   b. weight means movably disposed in the retaining means, and
   c. at least one continuous ring member located in the retaining means and being disposed between the inside surface of the retaining means and the weight means so that the weight means is located between the axis of rotation and the ring member,
   d. said ring member being composed of a resilient material and in direct contact with the weight means so that the weight means acts against the resilient ring member when the mass is rotated,
   e. said resilient ring member providing a sufficient amount of force to hold the weight means in place against the pull of gravity within the retaining means when the mass is not rotated but not being effective to overcome movement of the weight means with respect to the retaining means upon rotation of the assembly.

2. An assembly as defined in claim 15 wherein there are two ring members disposed on the inside surface of the retaining means and being laterally displaced with respect to each other,
said weight means being movably disposed between the inside surface of the retaining means and the ring members.

3. An assembly as defined in claim 1 wherein said retaining means includes means for attaching the dampening assembly onto a vehicular wheel assembly.

4. An assembly as defined in claim 1 wherein said retaining means includes a beveled hub portion having a structural configuration to fit against the brake drum of a vehicular wheel assembly.

5. An assembly as defined in claim 1 wherein said retaining means includes a hub portion having a slot configuration to fit over the studs of a vehicular wheel assembly.

6. An assembly as defined in claim 5 wherein said slot configuration includes a plurality of slots extending at a transverse angle with respect to the radius of the wheel assembly.

7. A vibration dampening assembly for a rotatable mass comprising:
   a. an annular retaining means having an outer flange portion and an inner flange portion forming an annular channel,
   b. said annular retaining means being adapted for attachment to a rotatable mass,
   c. weight means movably disposed in the retaining means, and d. at least one continuous ring member disposed inside the channel against the outer flange portion and acting directly against said weight means, e. said ring member being resilient and effective to provide a frictional force that holds the weight means in place when the mass is not rotating and is countered by the action of the centrifugal force on the weight means when the retaining means is rotating so that the weight means will move to a balance position.

8. In a vehicular wheel assembly, the combination comprising:

a. an annular vibration dampening assembly fixedly attached about the axis of rotation of the vehicular wheel assembly, b. said dampening assembly including an annular retaining means, weight means movably disposed in the retaining means, and at least one resilient continuous ring member located in the retaining means, c. said annular retaining means having an outer flange portion and an inner flange portion forming an annular channel, d. said resilient ring member being disposed inside the channel against the outer flange portion, e. said resilient ring member providing a sufficient amount of frictional force to hold the weight means in place against the pull of gravity within the retaining means when the mass is not rotating and is countered by the action of the centrifugal force on the weight means when the retaining means is rotating so that the weight means will move to a balance position.

* * * * *